United States Patent
Koshima et al.

(10) Patent No.: US 10,381,637 B2
(45) Date of Patent: Aug. 13, 2019

(54) CARBONACEOUS MATERIAL FOR NEGATIVE ELECTRODES OF NONAQUEOUS ELECTROLYTE SECONDARY BATTERIES

(71) Applicant: KURARAY CO., LTD., Kurashiki-shi (JP)

(72) Inventors: Akira Koshima, Okayama (JP); Taketoshi Okuno, Okayama (JP); Kenichi Koyakumaru, Okayama (JP); Hideharu Iwasaki, Okayama (JP); Kenta Aoki, Fukushima (JP); Makoto Imaji, Fukushima (JP); Yasuhiro Tada, Ibaraki (JP); Naohiro Sonobe, Fukushima (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/030,258

(22) PCT Filed: Oct. 10, 2014

(86) PCT No.: PCT/JP2014/005192
§ 371 (c)(1),
(2) Date: Apr. 18, 2016

(87) PCT Pub. No.: WO2015/059892
PCT Pub. Date: Apr. 30, 2015

(65) Prior Publication Data
US 2016/0268590 A1    Sep. 15, 2016

(30) Foreign Application Priority Data
Oct. 21, 2013    (JP) .................. 2013-218499

(51) Int. Cl.
*H01M 4/133*    (2010.01)
*H01M 4/583*    (2010.01)
(Continued)

(52) U.S. Cl.
CPC ........... *H01M 4/133* (2013.01); *H01M 4/366* (2013.01); *H01M 4/583* (2013.01); *H01M 4/587* (2013.01);
(Continued)

(58) Field of Classification Search
None
See application file for complete search history.

(56) References Cited

U.S. PATENT DOCUMENTS

| 5,834,138 A | 11/1998 | Yamada et al. |
| 5,985,489 A | 11/1999 | Ohsaki et al. |

(Continued)

FOREIGN PATENT DOCUMENTS

| CA | 2176452 | 11/1997 |
| EP | 2 624 345 A1 | 8/2013 |

(Continued)

OTHER PUBLICATIONS

Extended European Search Report dated Jun. 21, 2017 in Patent Application No. 14855385.2.
(Continued)

*Primary Examiner* — Christopher P Domone
(74) *Attorney, Agent, or Firm* — Oblon, McClelland, Maier & Neustadt, L.L.P.

(57) ABSTRACT

Provided is a less hygroscopic carbonaceous material that is obtained from a plant-derived carbonaceous raw material and that, when used as a negative electrode material for a nonaqueous electrolyte secondary battery, allows the battery to exhibit good battery characteristics. Provided is a carbonaceous material for negative electrodes of nonaqueous (Continued)

electrolyte secondary batteries. This carbonaceous material is a particulate carbonaceous material containing carbonaceous particles. The carbonaceous material has a BET specific surface area of 1 $m^2/g$ or more and less than 20 $m^2/g$. Each of the carbonaceous particles of the carbonaceous material has a core and a skin covering the core. The core contains a calcined product of a plant-derived carbonaceous raw material. The skin is made of a material that has higher electron emission ability upon irradiation with an electron beam than a material of the core.

14 Claims, 2 Drawing Sheets

(51) Int. Cl.
　　*H01M 4/36* (2006.01)
　　*H01M 10/0525* (2010.01)
　　*H01M 4/587* (2010.01)
　　*H01M 10/052* (2010.01)
　　*H01M 4/02* (2006.01)

(52) U.S. Cl.
　　CPC ...... *H01M 10/0525* (2013.01); *H01M 10/052* (2013.01); *H01M 2004/027* (2013.01); *H01M 2220/30* (2013.01)

(56) References Cited

U.S. PATENT DOCUMENTS

| | | | | |
|---|---|---|---|---|
| 6,303,249 | B1* | 10/2001 | Sonobe | H01M 4/133 429/231.4 |
| 6,631,073 | B1 | 10/2003 | Sakata et al. | |
| 2009/0297953 | A1 | 12/2009 | Shimizu et al. | |
| 2010/0285359 | A1 | 11/2010 | Hwang et al. | |
| 2011/0136014 | A1* | 6/2011 | Kay | C01B 25/45 429/231.8 |
| 2013/0065131 | A1* | 3/2013 | Hwang | H01M 4/133 429/231.8 |
| 2013/0209881 | A1* | 8/2013 | Do | H01M 4/134 429/213 |
| 2013/0224598 | A1 | 8/2013 | Kameda et al. | |
| 2013/0295446 | A1* | 11/2013 | Murata | H01M 4/134 429/188 |
| 2015/0188137 | A1 | 7/2015 | Komatsu et al. | |
| 2015/0263347 | A1 | 9/2015 | Imaji et al. | |
| 2017/0125811 | A1 | 5/2017 | Imaji et al. | |

FOREIGN PATENT DOCUMENTS

| | | |
|---|---|---|
| EP | 2 892 096 A1 | 7/2015 |
| JP | 9-293648 A | 11/1997 |
| JP | 2003-346801 A | 12/2003 |
| JP | 2008-124034 A | 5/2008 |
| JP | 2011-204906 A | 10/2011 |
| JP | 2013-534024 A | 8/2013 |
| JP | 2014-519135 A | 8/2014 |
| KR | 10-2001-0072891 | 7/2001 |
| KR | 10-2008-0042858 | 5/2008 |
| WO | WO2011157013 * | 12/2011 |
| WO | 2013/164914 A1 | 11/2013 |
| WO | 2014-038491 A1 | 3/2014 |

OTHER PUBLICATIONS

International Search Report dated Nov. 11, 2014, in PCT/JP2014/005192 Filed Oct. 10, 2014.

* cited by examiner

CARBONACEOUS MATERIAL FOR NEGATIVE ELECTRODES OF NONAQUEOUS ELECTROLYTE SECONDARY BATTERIES

TECHNICAL FIELD

The present invention relates to a carbonaceous material suitable for use in negative electrodes of nonaqueous electrolyte secondary batteries such as lithium-ion secondary batteries.

BACKGROUND ART

Graphite materials are mainly used as materials for negative electrodes of lithium-ion secondary batteries. On the other hand, non-graphite carbonaceous materials with higher capacities than the theoretical capacity of graphite materials have been reported, which means that such non-graphite carbonaceous materials have also been developed.

For example, Patent Literature 1 proposes improved activated carbon, which is one of the non-graphite carbonaceous materials, as a negative electrode material. This negative electrode material is produced by depositing a volatile organic component such as pitch on the surface of activated carbon. According to Patent Literature 1, deposition of such a volatile component allows control of pore distribution in activated carbon and thus the resulting negative electrode material is suitable for use in high-capacity and high-power batteries.

CITATION LIST

Patent Literature

Patent Literature 1: JP 2003-346801 A

SUMMARY OF INVENTION

Technical Problem

As raw materials of non-graphite carbonaceous materials, cheap and environmentally-friendly plant-derived carbonaceous raw materials have attracted attention. However, many of carbonaceous materials obtained from such plant-derived carbonaceous raw materials are highly hygroscopic due to their high porosity. If water is present in a nonaqueous electrolyte secondary battery, an acid is formed by hydrolysis of the electrolyte solution or a gas is generated by electrolysis of water, which causes problems. Therefore, it is desirable that a negative electrode material contain as little water as possible when used in a battery. This means that cumbersome efforts are required to store and handle highly hygroscopic negative electrode materials before they are used in batteries. In order to use carbonaceous materials obtained from plant-derived carbonaceous raw materials as negative electrode materials for nonaqueous electrolyte secondary batteries to be mass-produced, it is very important to reduce the hygroscopicity of these carbonaceous materials. The present inventors' studies indicate that the negative electrode material disclosed in Patent Literature 1 is suitable for increasing the capacity of batteries but is not suitable for use in nonaqueous electrolyte secondary batteries to be mass-produced because its hygroscopiticy is too high.

Needless to say, negative electrode materials for nonaqueous electrolyte secondary batteries are required not only to be less hygroscopic but also to be more suitable for improving the battery characteristics. Therefore, it is necessary to reduce the hygroscopicity of the negative electrode materials without degrading the battery characteristics.

It is therefore an object of the present invention to reduce the hygroscopicity of a carbonaceous material obtained from a plant-derived carbonaceous raw material so that the carbonaceous material can be used as a negative electrode material in a nonaqueous electrolyte secondary battery without degrading the battery characteristics.

Solution to Problem

The present inventors have started their studies with an attempt to improve a carbonaceous material obtained from a plant-derived carbonaceous raw material by applying the technique disclosed in Patent Literature 1, that is, deposition of a volatile organic component such as pitch onto the carbonaceous raw material, and as a result of their intensive studies, have found that the object of the present invention is achieved by the following carbonaceous material.

Thus, the present invention provides a carbonaceous material for negative electrodes of nonaqueous electrolyte secondary batteries. This carbonaceous material is a particulate carbonaceous material containing carbonaceous particles. The carbonaceous material has a BET specific surface area of 1 $m^2/g$ or more and less than 20 $m^2/g$. Each of the carbonaceous particles of the carbonaceous material has a core and a skin covering the core. The core contains a calcined product of a plant-derived carbonaceous raw material. The skin is made of a material that has higher electron emission ability upon irradiation with an electron beam than a material of the core.

The present invention also provides a negative electrode of a nonaqueous electrolyte secondary battery, containing the carbonaceous material of the present invention. The present invention further provides a nonaqueous electrolyte secondary battery including the negative electrode of the present invention.

Advantageous Effects of Invention

According to the present invention, it is possible to provide a less hygroscopic carbonaceous material that is obtained from a plant-derived carbonaceous raw material and that, when used as a negative electrode material for a nonaqueous electrolyte secondary battery, allows the battery to exhibit good battery characteristics.

DESCRIPTION OF EMBODIMENTS

The following description of exemplary embodiments of the present invention is provided for illustration purpose only and not for the purpose of limiting the invention to the following embodiments.

In an embodiment of the present invention, a particulate carbonaceous material contains a plurality of carbonaceous particles. The carbonaceous particles of the carbonaceous material of the present embodiment each has a core and a skin covering the core. When a cross section of the carbonaceous particle is observed with a SEM, the skin of the particle can be identified as a surface layer brighter than the core. A SEM is commonly used to observe an observation object by irradiating the object with an electron beam and detecting electrons emitted from the object. Therefore, an observation object made of a material having higher electron emission ability appears brighter than the other.

The core corresponds to the relatively dark inner portion of the cross section of the particle observed with a SEM. The core contains a calcined product of a plant-derived carbonaceous raw material. The carbonaceous raw material is not particularly limited as long as it is derived from a plant, in other words, as long as it is obtained from a plant raw material. Examples of the plant raw material from which the carbonaceous raw material is produced include palm shells, tea leaves, sugar canes, fruits (such as bananas and tangerines), straws, rice hulls, and bamboos. These examples include waste products of these materials obtained after they are used for the originally intended purpose (such as used tea leaves) and portions of these materials (such as banana and tangerine peels). A carbonaceous raw material derived from two or more different plant raw materials also can be used.

Preferable plant raw materials are palm shells because they are abundant and easily available. Examples of palm shells include coconut shells, oil palm shells, salak shells and double coconut shells. Coconut palms and oil palms are easily available in bulk because they are used in abundance as food products, detergent materials, bio-diesel oil materials, etc. The plant-derived carbonaceous raw material is preferably obtained from a coconut palm and/or an oil palm.

The plant-derived carbonaceous material is produced by heating a plant raw material to convert it into a carbon-rich particulate matter. This carbon-rich particulate matter is sometimes called "char", which is available, for example, in the form of palm shell char.

Since the plant-derived carbonaceous raw material can be doped with a large amount of an active material, it is basically suitable as a negative electrode material for a nonaqueous electrolyte secondary battery. However, this carbonaceous raw material contains a large amount of ash derived from metal elements contained in the plant, and this ash may affect the battery characteristics. Therefore, it is desirable to reduce the ash content in the plant-derived carbonaceous raw material by demineralization before it is calcined to obtain a carbonaceous material serving as a negative electrode material. Examples of the metal elements causing ash to be produced include potassium, sodium, magnesium, calcium, iron, and silicon, although they depend on the type of the plant raw material.

Demineralization is broadly divided into liquid-phase demineralization and gas-phase demineralization. Gas-phase demineralization, which is preferred because it does not require drying after demineralization, is described below, but the demineralization is not intended to be limited to gas-phase demineralization.

Gas-phase demineralization is performed by heating a demineralization object (i.e., a plant-derived carbonaceous raw material) in a gas phase containing a halogen element-containing gas. Examples of the halogen element-containing gas include chlorine, hydrogen fluoride, hydrogen chloride, and hydrogen bromide. The gas phase may further contain a non-oxidizing gas in addition to the halogen element-containing gas. Examples of the non-oxidizing gas include nitrogen, helium, and argon. Preferably, the gas phase for demineralization is preferably a mixed gas of a halogen element-containing gas and a non-oxidizing gas. The heating temperature for gas-phase demineralization is preferably 500° C. to 1100° C.

After the demineralization, the plant-derived carbonaceous raw material is calcined to form cores. In the present embodiment, skins are formed on the surface of the cores as the calcination of the carbonaceous raw material proceeds.

The skin corresponds to the relatively bright surface layer in the cross section observed with a SEM. In the present embodiment, the skin contains a carbonaceous material derived from a volatile component of an organic material prepared for the skins only. The skin may have regions that are formed of the volatile organic material component-derived carbonaceous material deposited in the pores of the calcined product of the plant-derived carbonaceous raw material.

The type of the organic material is not particular limited as long as it can supply the volatile component to form the skins. For example, a pitch or a resin can be used. The volatile component is typically a low molecular weight compound produced by thermal decomposition of the organic material during calcination. As is obvious from this, the low molecular weight organic compound itself may be used as the organic material. Examples of the pitch include petroleum pitches and coal pitches. Examples of the resin include thermoplastic resins such as polyethylene, polypropylene, polystyrene, and poly(meth)acrylic acid ester; and thermosetting resins such as phenol resins and epoxy resins. Examples of the low molecular weight organic compound include methane, ethylene, acetylene, propylene, benzene, toluene, naphthalene, and anthracene. In particular, pitch and polystyrene are preferred because they produce volatile components in a temperature range suitable for formation of skins, resulting in high skin formation efficiency, they are industrially easily available, and they are stable substances.

In the present embodiment, the skins are formed when the carbonaceous raw material and the organic material for forming the skins are calcined in an atmosphere containing both the carbonaceous raw material and the organic material. It is recommended to mix the carbonaceous raw material and the organic material before the calcination. It is preferable that the organic material be a particulate matter to facilitate mixing.

In the present embodiment, it is preferable to perform the calcination for forming the skins at a high temperature at which the structure of the cores can be converted into a desired one. This temperature is preferably 1150° C. or higher, more preferably 1200° C. or higher, and it is, for example, 1200° C. to 1300° C. It is preferable to perform the calcination in a non-oxidizing gas atmosphere. The non-oxidizing gas is preferably nitrogen gas, although any of the above-mentioned gases can be used.

A heating temperature of lower than 1000° C. is high enough only to deposit the volatile component. Therefore, volatile components are deposited in a temperature range of several hundred degrees, as conventionally proposed. For example, in Examples of Patent Literature 1, heating is performed at 670° C. As shown in Examples of Patent Literature 1, deposition of a volatile component increases the capacity and charge-discharge efficiency of a battery including a negative electrode made of a material obtained from activated carbon. However, as described in Patent Literature 1, the charge-discharge efficiency (about 35% in Example 6) obtained using palm shell activated carbon, which is a plant-derived carbonaceous raw material, is lower than the charge-discharge efficiency (about 41 to 66% in Examples 1 to 5) obtained using pitch-based activated carbon. These results seem to indicate that the plant-derived carbonaceous raw material need to be further improved. In addition, even if the plant-derived carbonaceous raw material is heated together with an organic material at a temperature lower than 1000° C., the hygroscopicity of the resulting carbonaceous material is not sufficiently reduced.

Figure 1:
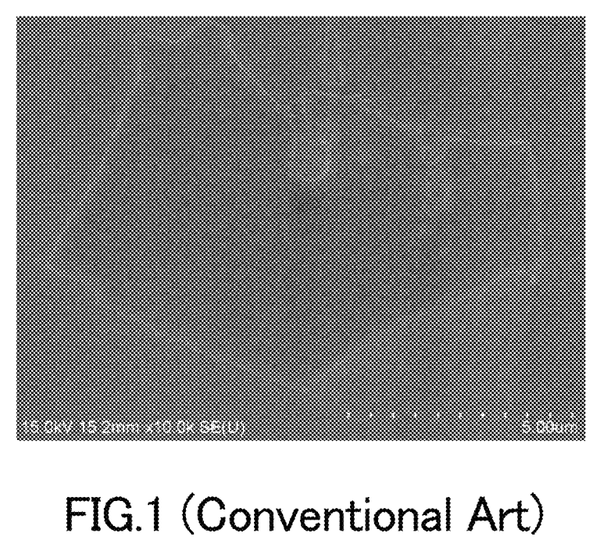
FIG. 1 is a photograph showing a scanning electron microscope (hereinafter referred to as "SEM") observation result of a carbonaceous particle of a conventional carbonaceous material.

FIG. 1 shows a SEM observation result of a cross section of a carbonaceous material obtained by calcining a carbonaceous raw material and an organic material at a temperature lower than 1000° C. (organic material: polystyrene, heating temperature: 800° C.). In FIG. 1, only a core is seen. A bright ring around a carbonaceous particle is an edge (i.e., a boundary between the carbonaceous particle and an embedding resin). The thickness of the edge is usually less than 50 nm, and not more than 100 nm. On the other hand, when calcination is performed at a temperature of about 1150° C. or higher, a skin is formed around the core (see FIG. 2) (organic material: polystyrene, heating temperature: 1270° C.). The skin is seen as a surface layer typically with a thickness of 100 nm or more, when a cross section of the carbonaceous particle is observed with a SEM.

Heating in a high temperature range causes a structural change in the plant-derived carbonaceous raw material. With this structural change, the deposited volatile component and the calcined product of the carbonaceous raw material are mixed together to form a skin serving as a surface layer of the particle (see FIG. 2) (organic material: polystyrene, calcination temperature: 1270° C.). This is probably the mechanism of formation of the skins. In the other words, it is presumed that while the volatile component is supplied from the organic material as the structural change in the plant-derived carbonaceous raw material is allowed to proceed, the requirements for formation of the skins are met. However, if the heating temperature is too high, the carbon skeleton of the resulting carbonaceous material is too rigid, which may cause a decrease in the discharge capacity. Therefore, it is preferable to perform heating at a temperature of about 1300° C. or lower.

It is recommended to observe the skin and the core under the standard measurement conditions suitable for a SEM used. The standard measurement conditions suitable for an observation object can be set by an automatic image adjustment function of the SEM. This function is called, for example, ABC (automatic brightness and contrast) control, and is carried out with a predetermined gradation (for example, a 256-level gradation) determined based on the maximum number of electrons and the minimum number of electrons detected by an electron detector.

With a change in the porous structure of the carbonaceous material by formation of the skins, reaction with an electrolyte solution is inhibited and absorption of water is reduced, and thus the charge-discharge efficiency and hygroscopicity are improved. However, in particular in order to sufficiently reduce absorption of water, it is desirable to reduce the hygroscopicity not only by a change in the porous structure by formation of the skins but also by a structural change in the cores. The formation of the skins and the structural change in the cores can be evaluated by a decrease in the specific surface area. Specifically, the specific surface area of the carbonaceous material is desirably less than 20 $m^2/g$. In the present embodiment, the specific surface area of the carbonaceous material is preferably 18 $m^2/g$ or less, more preferably 15 $m^2/g$ or less, even more preferably 12 $m^2/g$ or less, and optionally 10 $m^2/g$ or less. The lower limit of the specific surface area is not particularly limited, but the specific surface area may be, for example, 1 $m^2/g$ or more, and optionally 3 $m^2/g$ or more.

In this description, the specific surface area means a specific surface area (a BET specific surface area) determined by the BET method. A specific method for measuring the specific surface area is as follows. First, a nitrogen adsorption isotherm at 77 K is measured for multipoint analysis according to the BET equation so as to obtain a BET isotherm. Then, the specific surface area is calculated from the linear part of the BET isotherm in a relative pressure (p/p0) range from p/p0 of 0.001 to 0.35 (where p0 is a saturation pressure).

It is referable that the carbonaceous material of the present embodiment have a high brightness ratio between the core (i.e., a relatively dark inner portion) and the skin (i.e., a relatively bright surface layer), as observed with a SEM. As used herein, the brightness refers to the electron emission ability of the core or the skin. The skin is made of a material having higher electron emission ability upon irradiation with an electron beam than the material of the core, and it is preferable that the difference in the electron emission ability between the skin and the core be larger. A material having high brightness, i.e., high electron emission ability, has high electron conductivity and thus has a dense structure. The hygroscopicity of a material having such a dense structure is low. Specifically, when the brightness ratio, which is a ratio of the brightness of the skin to the brightness of the core, is 1.05 or more, the carbon density of the high brightness portion is high. That is, a high brightness ratio indicates that the skin has a higher carbon density than that of the inner portion and thus is less hygroscopic. The brightness ratio is more preferably 1.10 or more, and particularly preferably 1.20 or more.

The brightness ratio mentioned above is obtained as follows. Specifically, a cross section of a carbonaceous material is observed with a SEM to detect electronic signals of a particle and a Gaussian distribution is obtained from the electronic signals. The highest intensity edge between the particle and the embedding resin and the lowest intensity inner portion of the particle are identified, and their intensity values are adjusted within a range of 0 to 255 gradation levels. Thus, the ratio of the brightness of the surface layer of the particle to the brightness of the inner portion of the particle is obtained.

The average particle diameter of the carbonaceous particles of the carbonaceous material of the present embodiment is preferably in a range of 1 μm to 20 μm. This average particle diameter is preferably 3 μm to 18 μm, and more preferably 5 μm to 15 μm. The average particle diameter of the carbonaceous material can be adjusted by subjecting the plant-derived carbonaceous raw material to any type of mill grinding. It is preferable that the demineralized carbonaceous raw material be subjected to this grinding.

In this description, a value measured by flow particle image analysis is used as the average particle diameter. This measured value can be obtained using a wet-type flow particle imaging instrument, for example, "FPIA-3000" manufactured by Sysmex Corporation. This instrument works as follows. Carbonaceous particles as a sample to be measured in a dispersion in the form of a flat sample flow are sequentially irradiated with a strobe light, for example, at 1/60-second intervals to obtain their images, and the images thus obtained are analyzed to calculate the parameters of the particles such as the average particle diameter. Specifically, the average particle diameter is calculated as follows. The diameters of the particles are calculated based on the cross-sectional areas of the particles assuming that the particles in the images have a circular shape, and then the sum of the diameters is divided by the number of the particles to obtain the average particle diameter.

The skin may be thin as long as it is thick enough to cover the entire surface of the core, and thus there is no need to form an excessively thick skin. If the skin is too thick, the surface layer of the carbonaceous material has high resistance, doping and dedoping of lithium ions are impeded, and as a result, the charge-discharge efficiency may be reduced. Specifically, when the average particle diameter of particles without skins is defined as an average particle diameter A and the average particle diameter of the particles with skins is defined as an average particle diameter B, it is preferable that the ratio of the average particle diameter B to the average particle diameter A be 1 to 1.1. The value of (average particle diameter B/average particle diameter A) is more preferably 1 to 1.05.

As described above, in the present embodiment, it is preferable that the particulate carbonaceous material be obtained by calcining an organic material and particles of a plant-derived carbonaceous raw material in a non-oxidizing atmosphere at 1150° C. to 1300° C. so as to form the organic material-derived skin on the surface of the core containing a calcined product of the carbonaceous raw material. It is more preferable that the particulate carbonaceous material be obtained by forming the skin so that the ratio B/A of the average particle diameter B of the carbonaceous material to the average particle diameter A of the carbonaceous material is 1 to 1.1.

One of the features of the carbonaceous material of the present embodiment is low hygroscopicity. Specifically, when a carbonaceous material $\alpha$ obtained by drying the carbonaceous material for 2 hours under conditions of 140° C. and 133.3 Pa (1 torr) has an absorbed water content X and a carbonaceous material $\beta$ obtained by further leaving the carbonaceous material $\alpha$ for 2 hours under conditions of 30° C. and a relative humidity of 60% has an absorbed water content Y, subtraction of the absorbed water content X from the absorbed water content Y (absorbed water content Y–absorbed water content X) preferably gives a difference of 30000 ppm or less, particularly 25000 ppm or less. This difference (absorbed water content Y–absorbed water content X) is a measure of the water content in the carbonaceous material left in a water-containing atmosphere, that is, a measure of the water absorbing property of the carbonaceous material.

As another measure of the hygroscopicity of the carbonaceous material, a carbonaceous material $\gamma$ obtained by drying the carbonaceous material $\beta$ for 2 hours under conditions of 140° C. and 133.3 Pa preferably has an absorbed water content Z of 700 ppm or less, particularly 500 ppm or less. This absorbed water content Z is a measure of the content of water remaining in the carbonaceous material even after drying the carbonaceous material having absorbed water in a water-containing atmosphere, that is, a measure of the water desorbing property of the carbonaceous material.

As used herein, the absorbed water content X, Y, or Z is a value obtained by measuring, by Karl Fischer titration, a mass of water desorbed from the carbonaceous material $\alpha$, $\beta$, or $\gamma$ when the carbonaceous material $\alpha$, $\beta$, or $\gamma$ is heated to 250° C. and then dividing the measured mass of desorbed water by a mass of the carbonaceous material $\alpha$, $\beta$, or $\gamma$ before heating. In this division, the denominator is the mass of each of these carbonaceous materials before heating to 250° C.

Figure 2:
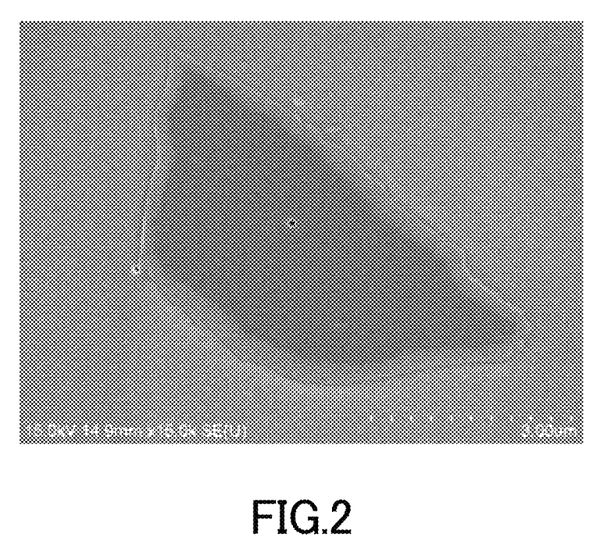
FIG. 2 is a photograph showing an example of a SEM observation result of a carbonaceous particle of a carbonaceous material of the present invention.

FIG. 2 shows an example of a SEM observation result of a cross section of a carbonaceous particle of the carbonaceous material of the present embodiment. The core is covered by the skin. The core containing a plant raw material-derived calcined product and the skin containing an organic material-derived volatile component form a structure in which the core and the skin are continuous across the boundary between them. The skin is formed on the surface of the core in a well-fitted manner to cover the fine pores in the surface of the core.

Figure 3:
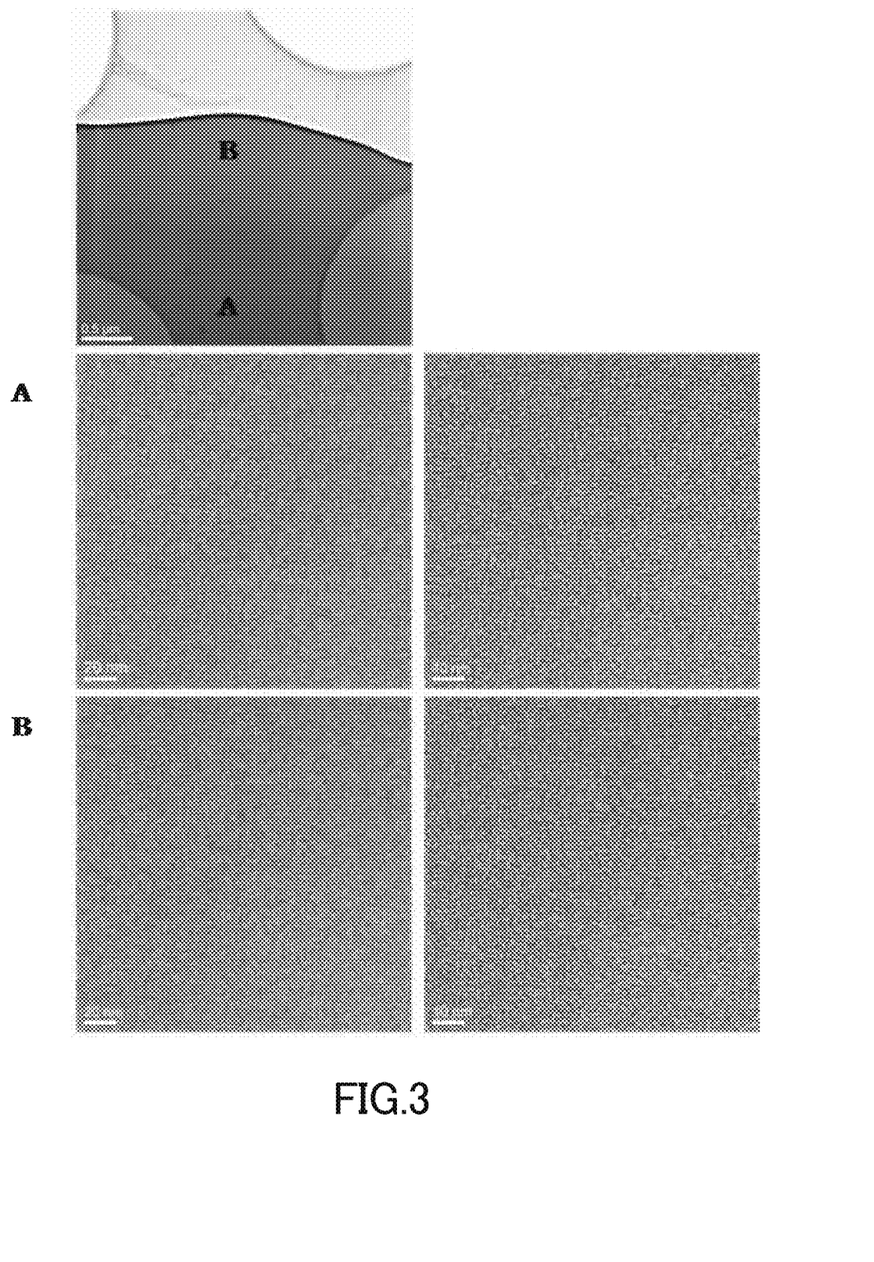
FIG. 3 shows photographs showing an example of a transmission electron microscope (hereinafter referred to as "TEM") observation result of a carbonaceous particle of a carbonaceous material of the present invention, in which A shows photographs of the inner portion of the carbonaceous particle while B shows photographs of the surface layer of the particle.

FIG. 3 shows examples of TEM observation result of a core (A in FIG. 3) and a skin (B in FIG. 3) of a carbonaceous particle. No structural difference is observed between the core and the skin. It is believed that the skin of the carbonaceous particle includes a fine, complicated composite structure of the calcined product of the plant-derived carbonaceous raw material and the volatile component of the organic material.

EXAMPLES

Example 1

Coconut-derived palm shell char was demineralized at 980° C. in a flow of hydrogen chloride so as to obtain a coconut-derived carbonaceous raw material.

Next, the carbonaceous raw material was ground in a jet mill. The average particle diameter of the carbonaceous raw material thus ground was 10.2 μm as a result of measurement using a wet-type flow particle imaging instrument ("FPIA-3000" manufactured by Sysmex Corporation). Then, the carbonaceous raw material was mixed with polystyrene particles having an average particle diameter of 0.3 mm as an organic material, and the resulting mixture was calcined at 1270° C. for 10 minutes in a nitrogen atmosphere. Thus, a particulate carbonaceous material was obtained. The carbonaceous raw material and the organic material were mixed at a mixing ratio of 10:1 in mass. The average particle diameter of the resulting particulate carbonaceous material was 10.5 μm as a result of measurement using the above-mentioned instrument.

The particulate carbonaceous material was observed with a SEM. A sample particle for the SEM observation was obtained by embedding the carbonaceous material in an epoxy resin (embedding resin), followed by polishing with a cross section polisher ("SM-09010" manufactured by JEOL, Ltd.) to expose the cross section of the particle and sputtering the cross section with platinum. The observation was performed using a SEM "SU-70" manufactured by Hitachi High-Technologies Corporation under the following measurement conditions: an accelerating voltage of 15 kV; a working distance of 15 mm; and a SEM magnification of 5000 to 20000. Observation image acquisition was performed in Super ExB mode in which secondary electron information and reflection electron information are combined to take images. The contrast was adjusted automatically.

The core and the skin were identified by the SEM observation of the cross section of the particle. As in the case of FIG. 2, the skin was formed around the inner portion of the particle. In order to measure the brightness of the carbonaceous particle in this SEM image, the "Line Profile" command of an image analysis software "Image-Pro Plus" manufactured by Nippon Roper was used to draw a measurement line from the core (darker portion) to the skin (brighter portion) of the particle. The brightness ratio of the skin to the core was 1.21.

The BET specific surface area of the carbonaceous material was 5.4 $m^2/g$ as a result of measurement using an automatic specific surface area/pore size distribution measurement instrument ("BELSORP-mini" manufactured by BEL Japan, Inc.)

A Karl Fischer moisture meter (a trace moisture meter "CA-200" manufactured by Mitsubishi Chemical Analytech Co., Ltd.) was used to measure the hygroscopicity of the carbonaceous material by Karl Fischer titration (coulometric titration). The carbonaceous materials α, δ, and γ mentioned above were subjected to the measurement. The difference (absorbed water content Y−absorbed water content X) was 15594 ppm, and the absorbed water content Z was 262 ppm.

Subsequently, a negative electrode containing the carbonaceous material and a coin cell including the negative electrode were prepared and subjected to a charge-discharge test. 94 parts by weight of the carbonaceous material, 6 parts by weight of polyvinylidene fluoride as a binder, and N-methyl pyrrolidone (NMP) as a diluting pasting agent were mixed so as to obtain a pasty negative electrode material. The paste was applied to a copper foil using an applicator and dried. Then, pressure was applied to compact the paste. Thus, a negative electrode with a thickness of 0.1 mm and a diameter of 14 mm was obtained.

As an electrolyte solution, a solution containing a 1:1 mixture of propylene carbonate and dimethoxyethane and 1.0 mol/l of lithium perchlorate ($LiClO_4$) as a supporting electrolyte was used. Lithium metal was used as a counter electrode, and a porous polypropylene film was used as a separator.

A coin cell (2032 type) for a charge-discharge test was prepared using the negative electrode, the electrolyte solution, the counter electrode, and the separator mentioned above. In this coin cell, in fact, the negative electrode made of the carbonaceous material serves as a positive electrode in terms of the relation between the potentials of this carbonaceous material electrode and the lithium metal electrode as a counter electrode. Therefore, the process of doping the carbonaceous material with lithium ions corresponds to discharging. However, for the sake of a simple explanation of a real battery, this doping process is referred to as charging while the process of dedoping lithium ions from the carbonaceous material electrode is referred to as discharging.

First, charging was performed at a constant current of 0.77 mA. As the constant current charging proceeded, the voltage of the coin cell gradually decreased. When the cell voltage reached 0 mV, the constant current charging was switched to constant potential charging. When the current density reached a very small value of 20 μA, the charging was stopped to take a 10-minute pause. Then, discharging was performed. The discharging was started at a constant current of 0.77 mA and stopped when the cell voltage reached 1.5 V. The discharge capacity was 438 mAh/g and the charge-discharge efficiency was 87.4%.

Example 2

A particulate carbonaceous material was obtained in the same manner as in Example 1, except that the demineralization temperature was changed to 870° C. This carbonaceous material was subjected to the same measurements as those in Example 1. The core and the skin were identified by the SEM observation of the cross section of the carbonaceous particle.

Example 3

A particulate carbonaceous material was obtained in the same manner as in Example 1, except that a petroleum-based pitch having an average particle diameter of 1 mm was used as an organic material, the carbonaceous raw material and the organic material were mixed at a ratio of 7:3 in mass, and the calcined pitch product was removed from the calcined carbonaceous material by sieving. This carbonaceous material was subjected to the same measurements as those in Example 1. The core and the skin were identified by the SEM observation of the cross section of the carbonaceous particle.

Example 4

An oil palm shell was carbonized for 60 minutes in a nitrogen atmosphere at 500° C. to obtain a palm shell char. The palm shell char was demineralized using dilute hydrochloric acid, followed by drying. Then, the resulting char was subjected to heat treatment in a nitrogen atmosphere at 980° C. to obtain an oil palm-derived carbonaceous material. Then, a particulate carbonaceous material was obtained in the same manner as in Example 1. This carbonaceous material was subjected to the same measurements as those in Example 1. The core and the skin were identified by the SEM observation of the cross section of the carbonaceous particle.

Comparative Example 1

A particulate carbonaceous material was obtained in the same manner as in Example 1, except that the particulate carbonaceous material was obtained by calcining a coconut-derived carbonaceous raw material in a nitrogen atmosphere without adding any organic material. This carbonaceous material was subjected to the same measurements as those in Example 1.

Comparative Example 2

A particulate carbonaceous material was obtained in the same manner as in Example 1, except that the particulate carbonaceous material was obtained by calcining an organic material and a coconut-derived carbonaceous raw material having been demineralized at 870° C. in a nitrogen atmosphere at 800° C. This carbonaceous material was subjected to the same measurements as those in Example 1.

In the carbonaceous materials obtained in Comparative Examples 1 and 2, no skin was identified by SEM cross section observation. Probably, the reason why no skin was identified in the carbonaceous material of Comparative Example 2 is that the calcination temperature (i.e., a temperature at which the organic material was deposited) was too low to sufficiently change the structure of the plant-derived carbonaceous raw material of the core and thus the volatile component supplied from the polystyrene particles penetrated deeply into the pores.

Table 1 collectively shows the measurement results of Examples and Comparative Examples.

The carbonaceous materials of Comparative Examples 1 and 2 having large specific surface areas were highly hygroscopic and unsuitable for use as negative electrode materials for nonaqueous electrolyte secondary batteries to be mass-produced. In contrast, in the carbonaceous materials of Examples 1 to 4, skins were identified by SEM cross section observation. The carbonaceous materials of Examples 1 to 4 having smaller specific surface areas had improved hygroscopicity. A comparison of the characteristics of the batteries using the carbonaceous materials of Examples 1 to 4 with the characteristics of the battery using the carbonaceous material of Comparative Example 1 revealed that the batteries of Examples had improved capacities. A comparison with the characteristics of the battery using the carbonaceous material of Comparative Example 2 revealed that the batteries of Examples had improved charge-discharge efficiencies. The battery characteristics of the batteries of Examples 1 to 4 were not inferior as a whole to those of the battery of Comparative Example 1, although the capacities of the batteries of Examples were lower than the capacity of the battery of Comparative Example 1. These results reveal that the carbonaceous materials of Examples 1 to 4, which are less hygroscopic and thus less harmful to the battery characteristics, are suitable for use as a negative electrode material for nonaqueous electrolyte secondary batteries to be mass-produced.

ness of 100 nm or more when the cross section of the carbonaceous particle is observed with the scanning electron microscope.

4. The carbonaceous material according to claim 1, wherein when a carbonaceous material α obtained by drying the carbonaceous material for 2 hours under conditions of 140° C. and 133.3 Pa has an absorbed water content X and a carbonaceous material β obtained by further leaving the carbonaceous material α for 2 hours under conditions of 30° C. and a relative humidity of 60% has an absorbed water content Y, subtraction of the absorbed water content X from the absorbed water content Y (absorbed water content Y−absorbed water content X) gives a difference of 15594 ppm or less, the absorbed water content X or the absorbed water content Y being a value obtained by measuring, by Karl Fischer titration, a mass of water desorbed from the carbonaceous material α or β when the carbonaceous material α or β is heated to 250° C. and then dividing the measured mass of desorbed water by a mass of the carbonaceous material α or β before heating.

5. The carbonaceous material according to claim 4, wherein a carbonaceous material γ obtained by drying the carbonaceous material β for 2 hours under conditions of 140° C. and 133.3 Pa has an absorbed water content Z of 262 ppm or less, the absorbed water content Z being a value obtained by measuring, by Karl Fischer titration, a mass of water desorbed from the carbonaceous material γ when the carbonaceous material γ is heated to 250° C. and then dividing the measured mass of desorbed water by a mass of the carbonaceous material γ before heating.

TABLE 1

| | | | | | | | Carbonaceous material | | | |
| --- | --- | --- | --- | --- | --- | --- | --- | --- | --- | --- |
| | | | | | | | | Battery characteristics | Water absorbing property: absorbed water | Water desorbing property: |
| | Plant raw material | De-mineralization temperature (° C.) | Organic material | Calcination temperature (° C.) | Brightness ratio | Particle diameter ratio (B/A) | BET specific surface area (m²/g) | Discharge capacity (mAh/g) | Charge* discharge efficiency (%) | content Y - absorbed water content X (ppm) | absorbed water content X (ppm) |
| Ex. 1 | Coconut | 980 | Polystyrene | 1270 | 1.21 | 1.03 | 5.4 | 438 | 87.4 | 15594 | 262 |
| Ex. 2 | Coconut | 870 | Polystyrene | 1270 | 1.10 | 1.01 | 3.6 | 423 | 89.9 | 4463 | 49 |
| Ex. 3 | Coconut | 980 | Pitch | 1270 | 1.25 | 1.03 | 10.2 | 421 | 87.0 | 22293 | 491 |
| Ex. 4 | Oil palm | 980* | Polystyrene | 1270 | 1.13 | 1.01 | 6.7 | 451 | 86.5 | 23169 | 540 |
| Com. Ex. 1 | Coconut | 980 | — | 1270 | — | — | 22.1 | 420 | 86.9 | 36804 | 807 |
| Com. Ex. 2 | Coconut | 870 | Polystyrene | 800 | — | — | 42.0 | 520 | 74.2 | 38671 | 988 |

*In Example 4, demineralization was performed by liquid-phase demineralization, drying, and then heat treatment at 980° C.

The invention claimed is:

1. A carbonaceous material, wherein
   the carbonaceous material is a particulate carbonaceous material comprising carbonaceous particles,
   the carbonaceous material has a BET specific surface area of 1 to 5.4 m²/g,
   each of the carbonaceous particles of the carbonaceous material consists of a single core and a skin covering the core,
   the core comprises a calcined product of a palm shell-derived carbonaceous raw material, and
   the skin comprises a material that has higher electron emission ability upon irradiation with an electron beam than a material of the core.

2. The carbonaceous material according to claim 1, wherein the skin is identified as a surface layer brighter than the core when a cross section of the carbonaceous particle is observed with a scanning electron microscope.

3. The carbonaceous material according to claim 2, wherein the skin identified as the surface layer has a thick- 6. The carbonaceous material according to claim 1, wherein the carbonaceous material has an average particle diameter of 1 μm to 20 pnm.

7. The carbonaceous material according to claim 1, wherein the palm shell-derived carbonaceous raw material is a carbonaceous raw material obtained from a coconut palm and/or an oil palm.

8. The carbonaceous material according to claim 1, wherein the particulate carbonaceous material is obtained by calcining an organic material and particles of the palm shell-derived carbonaceous raw material in a non-oxidizing atmosphere at 1150° C. to 1300° C. so as to form the skin on the surface of the core.

9. The carbonaceous material according to claim 8, wherein the skin is formed so that a ratio B/A of an average particle diameter B of the carbonaceous material to an average particle diameter A of the carbonaceous raw material is 1 to 1.1.

10. A negative electrode of a nonaqueous electrolyte secondary battery, comprising the carbonaceous material according to claim 1.

11. A nonaqueous electrolyte secondary battery comprising the negative electrode according to claim 10.

12. The carbonaceous material according to claim 1, wherein the palm shell-derived carbonaceous raw material is a carbonaceous raw material obtained from a coconut palm.

13. The carbonaceous material according to claim 1, wherein the palm shell-derived carbonaceous raw material is a carbonaceous raw material obtained from an oil palm.

14. The carbonaceous material according to claim 1, wherein the carbonaceous material has a BET specific surface area of 3 to 5.4 $m^2/g$.

* * * * *